May 22, 1956 J. E. P. BRUNE 2,747,175

SELECTIVE RECEIVING DEVICE FOR RINGING SIGNALS OF TELECOMMUNICATION SYSTEMS

Filed Dec. 2, 1954

United States Patent Office 2,747,175

Patented May 22, 1956

2,747,175

SELECTIVE RECEIVING DEVICE FOR RINGING SIGNALS OF TELECOMMUNICATION SYSTEMS

Jean Ernest Paul Brune, Paris, France, assignor to Lignes Telegraphiques & Telephoniques, Paris, France Application December 2, 1954, Serial No. 472,699

Claims priority, application France December 16, 1953

2 Claims. (Cl. 340—164)

The invention relates to a receiver device for energizing the audible signal (i. e. ringing the bell) of telecommunication systems where ringing is effected by means of one or more signals at a single frequency and to those using carrier currents, with a single side band and suppression of the carrier current, in which ringing is effected by restoring the carrier current.

The receivers used in the voice frequency or carrier current telecommunication equipments mentioned above are frequently low frequency receivers which fulfill two functions: on the one hand the amplification of speech currents, and, on the other hand, the amplification, detection and retransmission of the ringing currents. It is necessary, then, to avoid an untimely operation of the ringing device which might be caused by crosstalk, a component of the speech frequency spectrum close to the ringing frequency, a residual carrier or a line pilot current having a frequency close to the carrier frequency.

It is thus necessary that the ringing device be able to operate with an input level located in the vicinity of the normal value of the ringing level, but be unable to operate below a certain level and that the passing from the operation zone to the non-operating zone be as rapid as possible.

The ringing receiver device which is the object of the present invention makes it possible to obtain a very sharply defined operation threshold meeting the above conditions.

It comprises, in the anode circuit of an amplifier tube common to the speech and ringing currents, a transformer, the primary winding of which, in series with a winding of a ringing relay, forms, with a condenser in parallel with said primary winding a resonant circuit having a maximum efficiency at the ringing frequency and at the normal value of the ringing current; the voltage across the terminals of the secondary winding, after being rectified, is applied to the control grid of the amplifier tube, in such a manner that the anode current through the latter has a value definitely lower or higher than the value it has when no ringing signal is present, the variation of the said current causing the ringing relay to operate and to close a contact in a ringing circuit. According to the invention, the said transformer comprises a magnetic core such that the variation of the D. C. magnetic field due to the anode current in this core causes a variation of the permeability thereof, and consequently a variation of the resonance frequency of the resonant circuit. A type of core which is particularly suitable is a ferrite core with no airgap.

The invention will be explained in relation to an exemplary embodiment and with reference to the appended drawings.

Figure 1 represents a receiving device for a telecommunication system in which an amplifier tube 1, represented, by way of example as a triode, amplifies the speech currents and the signalling currents arriving at the input terminals 2.

Figure 1:
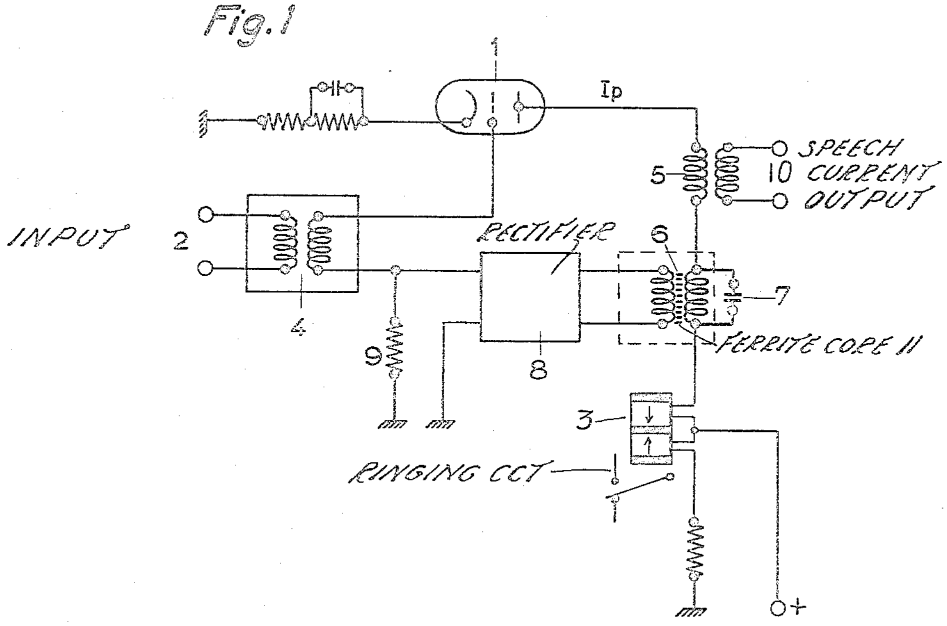
Figure 1 shows a receiving device for a carrier current telecommunication system.

The invention will be described in the case where the signalling device operates, in case of ringing, by a decrease in the anode current of the tube 1, and, consequently, by a current decrease through the signalling relay 3, but the invention would also apply to the case where the signalling device would operate by an increase in the anode current of the tube. In the embodiment represented on Figure 1, the relay 3 is assumed to be a differential relay, provided with two windings, the first of which is traversed by the anode current of tube 1, while the second is submitted to a constant compensation current, obtained for instance from the D.-C. source supplying the anode voltage of the tube. In the normal condition of the tube, when no ringing signals are received, there is more or less exact compensation between the actions of the two windings of the relay 3, and no pull is practically exerted on the armature of the latter. On the contrary, if the anode current of the tube decreases to a sufficient extent, the compensation no longer exists and a pull is exerted on the armature, eventually closing a contact in the ringing circuit.

However, the use of a differential relay is not an essential feature of the invention, and a single-winding relay could also be employed. In this case, if the ringing signals are assumed to cause a decrease in the anode current of the tube, the armature of the relay 3 would then be released, but correct operation of the device would still be obtained if the relay 3 were provided with "rest" contacts inserted in the ringing circuit and closed by the releasing of its armature.

Referring now again to Figure 1, a transformer 4, or, possibly, two transformers, the grid side windings of which are in series, apply to the control grid of the tube 1, the speech voltage or ringing voltage which arrives at 2. This voltage is amplified in tube 1.

In the anode circuit of the tube 1 are connected in series the primary windings of a transformer 5, of a transformer 6 as well as a ringing relay winding 3. The transformer 5 is intended for the retransmission of speech currents, and offers a low impedance to the ringing frequency. The transformer 6 is tuned to the ringing frequency by a condenser 7 placed in parallel with its primary winding. The normal anode current is $I_1$ in the absence of ringing current. A ringing frequency voltage is thus developed across the primary winding of the transformer 6.

Across the terminals of the secondary winding of the transformer 6 is a rectifier device 8; the rectified D. C. voltage at the output from 8, resulting from a ringing signal, is applied to the terminals of the resistance 9 in series wth the secondary of the grid transformer 4, in such a manner as to make more negative the grid bias of tube 1 with respect to its cathode and decreases its anode current to a value lower than $I_1$. As the magnetic permeability of the core of the transformer 6 varies with the intensity of the anode current of tube 1, there exists a predetermined value of this intensity for which the circuit consisting of the primary winding of 6 and of the condenser 7 is tuned to the frequency of the ringing signal, a maximum voltage at this frequency being then developed across the said primary winding. Actually, the voltage rectified by the rectifier device 8 produces at the terminals of the resistance 9 a voltage which in turn changes the value of the control grid bias of the amplifier 1 and thereby helps the resonance condition to be reached and the anode current to assume a predetermined intensity $I_2$ definitely lower than $I_1$.

Figure 2:
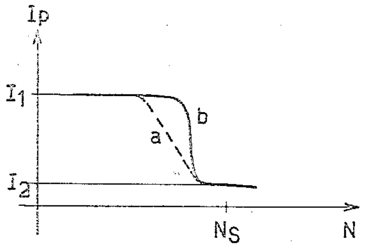
Figure 2 represent response curves of a ringing current receiving device according to Figure 1.

If an extraneous ringing voltage arrives at 2 with a level lower than the normal ringing level $N_s$ or having a frequency different from the ringing frequency, the resultant anode current remains larger than $I_2$ and the variation of this current as a function of the lower level N of the ringing voltage at the input to 2 is represented in Figure 2 by the curve "*a*" in dotted line. For avoiding wrong ringing retransmissions it is necessary that the passing from the current $I_1$ to $I_2$ be effected rapidly and that there be no intermediate stage.

A feature of the present invention is the provision of a means for obtaining this rapid transition between the currents $I_1$ and $I_2$; it consists in the use, for the constitution of the transformer 6 a magnetic core 11 of such a material that a variation of the D. C. magnetic field in the transformer causes a strong and well-determined and reversible variation in the permeability of said core 11; a type of core which is particularly suitable is a ferrite core with no airgap.

To this effect, the transformer 6 and the condenser 7 are so dimensioned as to form a resonant circuit having a maximum efficiency at the ringing frequency, for the value $I_2$ of the current flowing through the primary of the transformer 6.

At a different level of the normal ringing level $N_s$ or at a frequency other than the ringing frequency, the value of the anode current is different from $I_2$; the permeability of the core of the transformer 6 has a different value and there results a variation of the resonance frequency which becomes different from the ringing frequency; the value of the anode current remains higher than the corresponding value obtained in the case of a circuit, tuned to the ringing frequency, independently of the intensity of the anode current; the response curve thus obtained is represented in Figure 2 by the curve "*b*," in solid line, hence a curve the slope of which is greater than that of the curve "*a*" which would correspond to the case of a transformer with a constant permeability core.

What I claim is:

1. In a ringing signal receiver for a telecommunication system in which the ringing signals are transmitted at a predetermined frequency, having an electron tube including at least a cathode, a control grid and an anode, means for applying ringing signal voltages to said control grid, a relay energized by anode current of said tube, a transformer having a core of magnetic material and a first and a second winding, the first of which is traversed by said anode current and the second of which feeds a rectifier, means for applying direct-current voltage rectified by said rectifier to said control grid for causing said anode current to vary and a condenser in parallel connection with one of said windings; the improvement wherein the core of the transformer is made of a material the magnetic permeability of which varies rapidly with the intensity of a direct-current magnetic field applied thereto and wherein condenser has a capacity value such that said transformer be tuned at said predetermined frequency for a first predetermined value of said anode current and be off tuning for a second predetermined value of same said anode current.

2. A ringing signal receiver as claimed in claim 1, wherein the said material is ferrite and the core includes no air gap.

References Cited in the file of this patent

UNITED STATES PATENTS

| | | |
|---|---|---|
| 2,651,684 | Hargreaves | Sept. 8, 1953 |
| 2,654,002 | Hooijkamp | Sept. 29, 1953 |